(12) United States Patent
Jungert et al.

(10) Patent No.: US 8,210,593 B2
(45) Date of Patent: Jul. 3, 2012

(54) ARRANGEMENT OF A COMPONENT AND OF A DRIVE ELEMENT ASSIGNED TO THIS COMPONENT

(75) Inventors: Dieter Jungert, Weissach (DE); Tassilo Gilbert, Pforzheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 344 days.

(21) Appl. No.: 12/559,623

(22) Filed: Sep. 15, 2009

(65) Prior Publication Data

US 2010/0148532 A1 Jun. 17, 2010

(30) Foreign Application Priority Data

Dec. 17, 2008 (DE) .......................... 10 2008 063 450

(51) Int. Cl.
*B60N 2/06* (2006.01)
(52) U.S. Cl. ................... 296/65.15; 296/65.18; 248/429
(58) Field of Classification Search ............... 296/65.15, 296/65.18; 248/429
See application file for complete search history.

(56) References Cited

U.S. PATENT DOCUMENTS

| 7,404,584 B2* | 7/2008 | Maruyama et al. ........ 296/65.08 |
| 2008/0093875 A1* | 4/2008 | Hatta et al. ................. 296/65.01 |

FOREIGN PATENT DOCUMENTS

| AT | 413 580 | 4/2006 |
| DE | 2 239 256 | 2/1974 |
| DE | 298 14 449 | 1/1999 |
| DE | 198 48 952 | 5/2000 |
| DE | 10 2006 002 520 | 7/2006 |
| EP | 0 027 416 | 4/1981 |

* cited by examiner

*Primary Examiner* — Joseph Pape
(74) *Attorney, Agent, or Firm* — Gerald E. Hespos; Michael J. Porco

(57) ABSTRACT

An arrangement is provided for a component (6) and a drive element (11, 12) for the component. The drive element has a housing (9). The component is produced by a primary forming process, such as die-casting, thixomolding or plastic injection molding so that a region of the component defines the housing of the drive element. The component and the housing are distinguished by a low weight and a small structural space requirement.

7 Claims, 1 Drawing Sheet

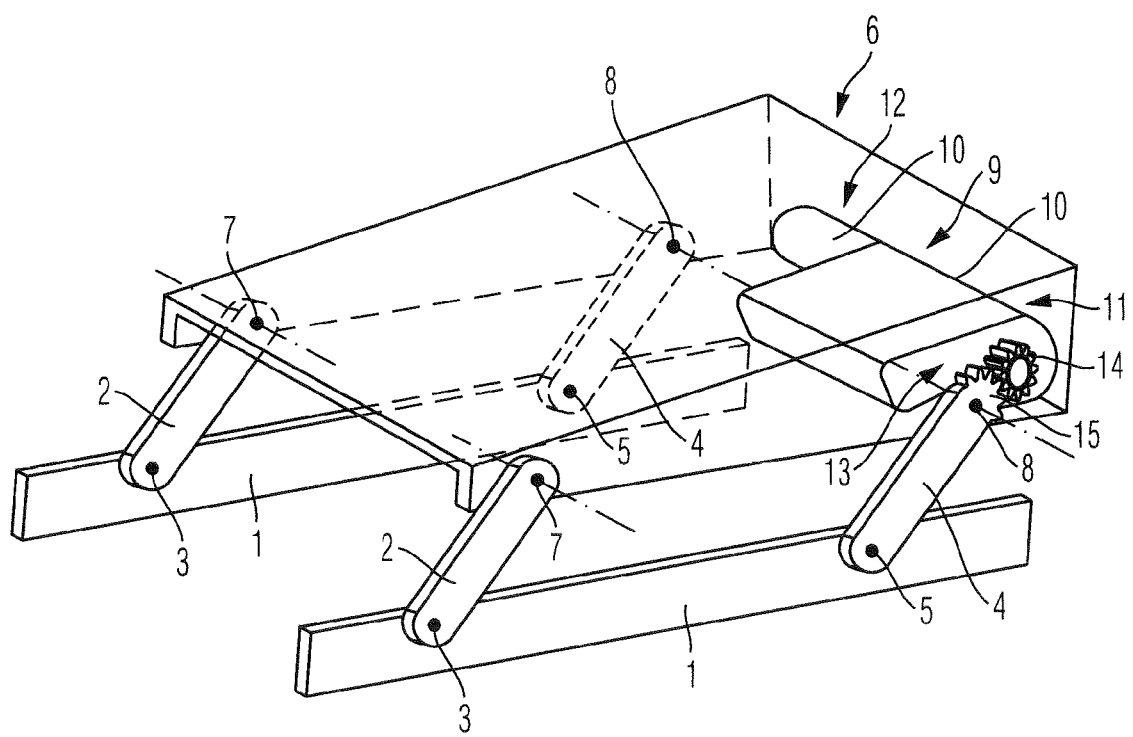

ARRANGEMENT OF A COMPONENT AND OF A DRIVE ELEMENT ASSIGNED TO THIS COMPONENT

CROSS-REFERENCE TO RELATED APPLICATIONS

This application claims priority under 35 USC 119 to German Patent Application No. 10 2008 063 450.6 filed on Dec. 17, 2008, the entire disclosure of which is incorporated herein by reference.

BACKGROUND OF THE INVENTION

1. Field of the Invention

The invention relates to an arrangement of a component and a drive element for the component.

2. Description of the Related Art

DE-OS 22 39 256 discloses a window lift device with an electric-motor drive for use in a motor vehicle. There, the component is a base plate and a housing, which are designed as a single piece. A dividing wall divides the housing into a space for an electric motor and a space for a transmission. The housing defines a convexity out of the plane of the base plate, and is open in the plane of the base plate to allow insertion of the motor and the transmission. The motor and the transmission each constitute stand-alone functional units and, consequently, each has its own housing. The single-piece component defined by the base plate and the housing is produced in a die-casting process. Zinc, plastic or magnesium typically is used for this purpose.

The arrangement described is distinguished by a very large structural space requirement, because the component and the electric-motor drive constitute functionally separate components. Further, a component with a housing and a drive element having a stand-alone housing is heavy. In addition, heat dissipation from the drive unit, thus from the motor and/or the transmission is inadequate because the drive element has its own housing.

EP 0 027 416 A1 discloses a motor-vehicle seat made of an injection-molded thermoplastic material. An adjustment mechanism for the seat is formed integrally with part of the seat.

An object of the invention is to so develop a component and a housing of the type described above, but with a low weight and a small structural space requirement.

SUMMARY OF THE INVENTION

The invention relates to component produced at least partly by a primary forming process. At least a partial region of the component is realized in such a way that the partial region constitutes the housing of the drive element.

The component may be a structural part, a housing or a cover.

The component may be produced by die-casting, thixomolding or plastic injection molding.

The drive element preferably is an electric motor and/or transmission.

A partial region of the component preferably is formed by primary forming in such a way that the partial region also serves as a housing of the drive element, such as the electric motor or transmission. More particularly, the housing may accommodate corresponding magnets or coils of an electric motor, or gear wheels of a transmission unit. The component thus has a double function, so that it is possible to dispense with a separate housing for the drive element, such as for the electric motor or the transmission.

The component may be a structural part of a seat structure of a motor vehicle, and preferably is a light-metal seat structure of a motor vehicle. The housing for the motor or for the transmission for a corresponding adjustment of the seat structure may be formed concomitantly with the production of the seat structure.

Production of the component by primary forming enables the production of complex geometries that constitute the cavity for the constituent parts of the motor and/or of the transmission that are surrounded by the housing. As a result, heat produced in the motor or in the transmission is dissipated better through the adjoining structure of the component than in the case of a separate arrangement of a motor/transmission unit. Furthermore, the stiffness of the component can be increased, in that the housing defining a constituent part of the component is used purposefully, and positioned in load paths. Moreover, the structural space requirement of the integrated system is reduced.

The arrangement of the invention has various advantages. For example heat is dissipated efficiently from the drive element, in particular from the transmission and/or motor. Furthermore, the absence of a separate housing reduces weight. Still further, the partial region of the component that constitutes the housing of the drive element contributes to the stiffness of the component. Finally, there is a substantial resultant package advantage. In addition, this functional integration results in a reduction of components and, consequently, achieves a corresponding cost saving.

BRIEF DESCRIPTION OF THE DRAWING

FIG. 1 a is a schematic representation of a seat structure of a motor vehicle seat that is mounted pivotally in seat rails.

DETAILED DESCRIPTION OF THE PREFERRED EMBODIMENT

Two seat rails 1 are mounted in the region of the driver's seat of a passenger car. The seat rails 1 can be displaced and/or fixed in seat-rail receivers (not shown) that are mounted in the vehicle floor. Two front link 2 are freely pivotable about axles 3 mounted in front portions of the respective seat rails 1. Similarly, rear links 4 are pivotable about axles 5 mounted in rear portions of the respective seat rails 1. Regions of the links 2 and 4 that are distant from the seat rails 1 accommodate a seat structure 6 referred to generally herein as a component. A rear region of the seat structure 6 accommodates a seat-back structure of the vehicle seat, in a manner that is not shown.

The links 2 and 4 mounted pivotally to each respective seat rail 1 are substantially parallel to each other and, in the illustrated position of the seat structure 6, are directed obliquely back from their pivot axles 3 and 5.

Upper end portions of both front links 2 are mounted pivotally to front parts of the seat structure 6 by axels 7 and upper end portions of both rear links 4 are mounted pivotally to rear parts of the seat structure by axles 8.

The seat structure 6 is produced by a primary forming process (e.g. die-casting, thixomolding, plastic injection molding). More particularly, a rear region of the seat structure 6 is formed with a cavity 10 that constitutes part of the cast structure. The region of the seat structure 6 that adjoins the cavity 10 is formed simultaneously to define a housing 9 for an arrangement that includes a transmission and electric motor 12. The housing 9 is a constituent integral or unitary part of the seat structure 6 and thus is formed by primary forming to accommodate magnets or coils of the electric motor 12, and gear teeth of the transmission 11, which are not shown. The rear region of the seat structure 6 thus has a double function, and it is possible to dispense with a separate housing for the electric motor or the transmission. The seat structure 6 is cast or otherwise formed with a lateral opening 13 for receiving a transmission 11 and electric motor 12. The output gear wheel 14 of the transmission 11 meshes with a toothing 15 of the rear link 4 arranged adjacently to the opening 13, and the toothing is arranged concentrically relative to the axle 8.

The component, in particular the seat structure 6, is composed, in particular, of light metal. In an alternative embodiment, the component is composed of plastic or of fiber-reinforced plastic.

What is claimed is:

1. A vehicular seat assembly, comprising:
rails mounted to a floor of a vehicle;
links having lower ends pivotally connected to the rails and upper ends opposite the lower ends;
a unitary seat structure pivotally connected to the upper ends of the links and including a housing that is a unitary part of the unitary seat structure; and
a drive element mounted in the housing of the unitary seat structure so that operative parts of the drive element are enclosed at least partly by the housing that is a unitary part of the unitary seat structure, the drive element being operatively connected to at least one of the links for adjusting a position of the seat structure relative to the rails.

2. The vehicular seat assembly of claim 1, wherein the housing that is a unitary part of the unitary seat structure is formed with an opening in a side surface that opens in a direction transverse to the rails for receiving the drive element.

3. The vehicular seat assembly of claim 1, wherein the unitary seat structure is made of a light metal.

4. The vehicular seat assembly of claim 1, wherein the drive element is an electric motor and a transmission.

5. The vehicle seat assembly of claim 1, wherein the unitary seat structure is a die-cast light metal, a thixomolded light metal or an injection molded plastic.

6. The vehicle seat assembly of claim 1, wherein the housing is unitary with a rear end of the unitary seat structure.

7. The vehicle seat assembly of claim 1, wherein the housing that is a unitary part of the unitary seat structure is the only housing surrounding the operative parts of the drive element.

* * * * *